(12) United States Patent
Iraschko et al.

(10) Patent No.: US 8,827,050 B2
(45) Date of Patent: Sep. 9, 2014

(54) DISC BRAKE ADJUSTING DEVICE HAVING A CONE CLUTCH UTILIZING CLAMPING BALLS

(75) Inventors: Johann Iraschko, Schweitenkirchen (DE); Georg Kempinger, Eching (DE); Florian Orgler, Munich (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 113 days.

(21) Appl. No.: 13/015,954

(22) Filed: Jan. 28, 2011

(65) Prior Publication Data

US 2011/0203883 A1 Aug. 25, 2011

Related U.S. Application Data

(63) Continuation of application No. PCT/EP2009/005410, filed on Jul. 27, 2009.

(30) Foreign Application Priority Data

Jul. 30, 2008 (DE) .......................... 10 2008 035 367

(51) Int. Cl.
*F16D 55/02* (2006.01)
*F16D 65/14* (2006.01)
*F16D 65/56* (2006.01)

(52) U.S. Cl.
CPC .............. *F16D 65/56* (2013.01); *F16D 65/568* (2013.01)
USPC ......................................... 188/71.8; 188/214

(58) Field of Classification Search
CPC ..... F16D 65/568; F16D 65/567; F16D 65/18; F16D 65/46; F16D 65/54; B61H 5/00
USPC ................................ 188/71.7, 71.8, 214, 71.1
See application file for complete search history.

(56) References Cited

U.S. PATENT DOCUMENTS

| 3,797,611 A * | 3/1974 | Hurt .............................. 188/71.8 |
| 2007/0209890 A1 | 9/2007 | Iraschko |

(Continued)

FOREIGN PATENT DOCUMENTS

| DE | 33 41 059 A1 | 5/1985 |
| DE | 34 10 249 A1 | 9/1985 |

(Continued)

OTHER PUBLICATIONS

International Search Report with English language translation dated Feb. 24, 2010 (Six (6) pages).

(Continued)

*Primary Examiner* — Vishal Sahni
(74) *Attorney, Agent, or Firm* — Crowell & Moring LLP

(57) ABSTRACT

A wear adjustor is provided for adjusting the wear of brake pads and a brake disc of a pneumatic disc brake having a brake application device actuated by a rotary lever. The wear adjustor is preferably inserted into an adjusting spindle of the brake application device. An axial bearing is formed axially on a side of a drive ring, and a ball ramp coupling with a freewheel function is formed axially on the opposite side of the drive ring. The ball ramp coupling has balls and a drive socket which is arranged axially, on the drive side, between the axial bearing and the balls thereof, a cone clutch being arranged between the clutch ring on the output side and an elastic sleeve for a cylinder spring. The cone clutch has the output-side clutch ring and a cone socket connected to the elastic sleeve, and clamping balls are arranged between the output-side clutch ring and the cone socket.

7 Claims, 6 Drawing Sheets

(56) References Cited

U.S. PATENT DOCUMENTS

2008/0217125 A1 * 9/2008 Iraschko ............ 188/196 BA
2011/0203883 A1 8/2011 Iraschko et al.

FOREIGN PATENT DOCUMENTS

| DE | 36 15 985 A1 | 11/1987 |
| DE | 197 29 024 C1 | 1/1999 |
| DE | 102 34 210 A1 | 1/2004 |
| DE | 10 2004 037 771 A1 | 3/2006 |
| DE | 10 2006 007 684 A1 | 8/2007 |
| GB | 2 332 027 A | 6/1999 |
| JP | 63-4276 U | 1/1988 |
| JP | 2008-508490 A | 3/2008 |
| WO | WO 2006/099938 * | 9/2013 |

OTHER PUBLICATIONS

German Office Actiion with English language translation dated Sep. 21, 2009 (Twelve (12) pages).

Japanese Office Action dated Aug. 13, 2013 with English translation (Five (5) pages).

* cited by examiner

DISC BRAKE ADJUSTING DEVICE HAVING A CONE CLUTCH UTILIZING CLAMPING BALLS

CROSS-REFERENCE TO RELATED APPLICATIONS

This application is a continuation of PCT International Application No. PCT/EP2009/005410, filed Jul. 27, 2009, which claims priority under 35 U.S.C. §119 from German Patent Application No. DE 10 1008 035 367.1, filed Jul. 30, 2008, the entire disclosures of which are herein expressly incorporated by reference.

This application contains subject matter related to U.S. application Ser. Nos. 13/015,974, 13/016,418, 13/016,078, and 13/015,930, entitled "A Disc Brake Adjusting Device Having an Output Side Coupling Ring with a Defined Working Rotational Axis," "Method for Fixing an Adjustment Device on a Disc Brake," "A Disc Brake Adjustment Device Having a Blocking Device," and "A Disc Brake Adjusting Device with a Torque Dependent Coupling" filed on even date herewith.

BACKGROUND AND SUMMARY OF THE INVENTION

The invention relates to an adjusting device for a disc brake and, in particular, an adjusting device for a pneumatically actuated disc brake having a rotary-lever-actuated brake application device, which adjusting device can preferably be inserted into an adjusting spindle of the disc brake.

Adjusting devices or wear adjustors for disc brakes exist in various embodiments. DE 10 2004 037 771 A1 (having U.S. published counterpart application US2009/209890 A1) discloses an adjusting device for a disc brake, the specifications of which are expressly incorporated by reference herein. This adjusting device is suitable for a pneumatically actuated disc brake, in particular one of sliding-caliper design. Furthermore, the adjusting device can, however, also be used in pneumatically actuated fixed-caliper or pivoting-caliper disc brakes.

Pneumatically actuated disc brakes have over time become standard equipment on heavy commercial vehicles. Such disc brakes require mechanical boosting or "force multipliation" in order to produce the demanded brake application force, because the force of the pneumatically charged brake cylinders is restricted on account of the pressure level (at present approximately 10 bar) and the limited structural size of the brake cylinder. Presently known pneumatically actuated disc brakes have boost ratios of between 10:1 and 20:1. The piston strokes of the brake cylinders are in the range from 50 mm to 75 mm, resulting in brake application travels of approximately 4 mm for pressing the brake pads against the brake disc.

The friction material thickness of the brake pads lies in the range of 20 mm, and because two pads are installed, this results in a wear travel of approximately 40 mm, not taking disc wear into consideration. This travel is a multiple greater than the abovementioned brake application travel. It is therefore necessary for the brake to be adjusted correspondingly to the pad wear by means of a device. The prior art provides automatic wear adjustment by means of which the so-called air play, that is to say the gap between the brake pads and the brake disc in the non-actuated state, is kept constant independently of the wear state and wear behavior of the brake pads.

In commercial vehicles, use is very often made of disc brakes which have an adjuster which is arranged concentrically in the cavity of a threaded spindle and which is driven eccentrically by a rotary brake lever via a drive element (for example shift finger, toothed wheel). During a braking process, the rotary lever which is coupled to the piston rod of the brake cylinder performs a rotational movement. Before the rotational movement of the lever is introduced into the adjuster via the coupling mechanism of the adjusting means (for example shift fork and shift finger or toothed wheels), a so-called idle travel must be overcome. This travel is decisive of the size of the so-called air play, because during the movement, the adjustment is not activated, and the brake application travel therefore constitutes the air play. After the idle travel is overcome, the adjuster is set in a rotational movement, and an adjusting process is initiated by the coupling to the threaded spindle or tube.

DE 10 2004 037 711 A1 describes an adjuster of this type, which is shown in FIG. 5. The adjuster is composed substantially of the following functional elements: shaft 2; bearing disc 3; axial bearing 5; collar bush, or spacer sleeve 19; shift fork, or drive ring 6; ball ramp clutch 7; cone clutch 17; and cylindrical spring 12. With regard to the description, reference is made to DE 10 2004 037 711 A1.

An important element of the adjuster is the directional clutch. This function is realized by the interaction of the ball ramp clutch 7 and the cone clutch 17.

A rotational movement is introduced by the rotary lever into the shift fork with the drive ring 6, and into the ball ramp clutch 7 of the adjuster. The axial force hereby produced in the ball ramp clutch 7 generates, in the cone clutch 17, a friction moment which is dependent on friction coefficient, taper angle and friction radius.

In order that slipping of the cone clutch 17 does not occur, it is necessary, as in all friction-dependent freewheel systems, for the self-locking condition to be met, that is to say the generated friction force or generated friction moment must be greater than the clutch force or clutch torque to be transmitted:

$$M_{cone\ clutch} > M_{ramp\ clutch}$$

During the course of development, it has been found that designing the cone clutch 17 within the given boundary conditions is highly problematic.

In order to provide a reliable clamping action even with very low friction coefficients (approx. 0.07) in the cone clutch 17, it is necessary for the cone clutch 17 to be designed with a relatively steep taper angle $\alpha_K$. The problem here is the release behavior in the axial direction. During relatively long periods of operation, it may occur that the cone clutch 17 no longer releases when relieved of load, and that as a result, the freewheel function is no longer provided.

It is therefore the object of the present invention to provide an adjusting device with a cone clutch, with the above disadvantages being eliminated or significantly reduced, and further advantages being obtained.

This and other objects are achieved by an adjusting device for adjusting for wear of the brake pads and the brake disc of a pneumatically actuated disc brake having a rotary-lever-actuated brake application device, which adjusting device can preferably be inserted into an adjusting spindle of the disc brake. An axial bearing is formed axially on one side of a drive ring and a ball ramp clutch with freewheel function is formed axially on the opposite side of the drive ring. The ball ramp clutch has balls, a drive bush arranged at the drive input side axially between the axial bearing and the balls thereof and a drive-output-side clutch ring. A cone clutch is arranged between the drive-output-side clutch ring and a spring sleeve for a cylindrical spring. The cone clutch has the drive-outputside clutch ring and a tapered bush which is connected to the spring sleeve. Clamping balls are arranged between the drive-output-side clutch ring and the tapered bush.

The cone clutch is equipped with clamping balls. By means of the clamping balls, it is obtained that the inner tapered bush can move in the axial direction without significant frictional locking on account of the rolling movement of the balls. As a result of the mounting of the balls in axially running longitudinal grooves, it is obtained that, in contrast, a friction-based blocking action is provided in the tangential direction.

This design offers the following advantages:
(1) correct release behavior in the axial direction even with very small taper angles;
(2) high friction action in the tangential direction;
(3) as a result of the mounting of the balls in grooves, linear contact, and therefore relatively favorable Hertzian stress, is provided between the balls and counterpart surface;
(4) cost-effective production of the parts by means of non-cutting shaping technology; and
(5) installation-space-saving design.

In one embodiment, it is provided that the tapered bush has an external profile which corresponds to an internal profile of the spring sleeve for a rotationally conjoint connection. This permits simple assembly, with a positively locking rotational connection being provided at the same time.

In an alternative embodiment, the tapered bush and the spring sleeve may be formed in one piece, as a result of which the number of parts, and assembly times, can be reduced.

In a further embodiment, it is provided that the axial bearing is formed by one side of the drive ring, by rolling bodies and by a collar of a collar bush which extends axially through the ball ramp clutch. This likewise reduces the number of different parts, and provides a compact design.

It is also provided that one end of the collar bush which extends through the ball ramp clutch forms, directly or via a thrust washer, an axial stop for the tapered bush. In this way, it is made possible for the axial bearing and ball ramp clutch to be assembled and held together in a simple manner, and minimal play of the axial bearing and ball ramp clutch is maintained.

A disc brake, in particular pneumatically actuated disc brake, has an adjusting device according to the above description.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
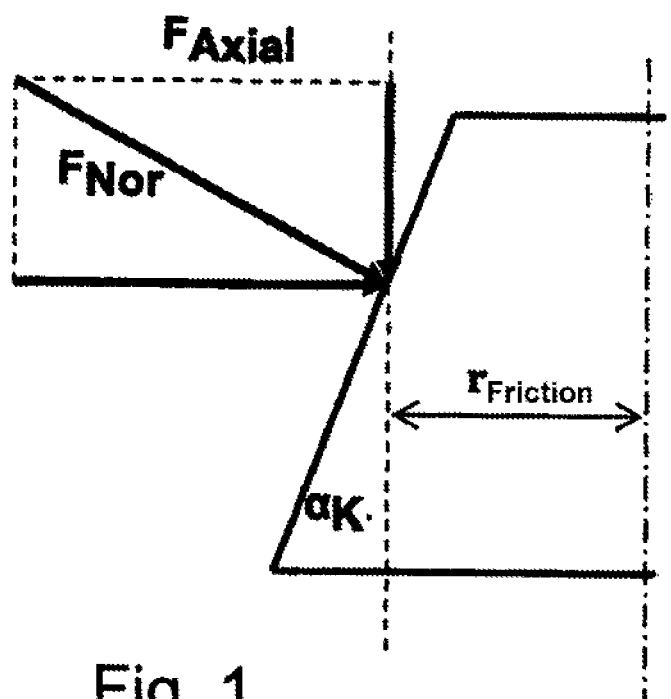
FIG. 1 is a sketch of the principles of the action of friction on a cone.

Elements with the same or similar functions are provided with the same reference numerals in the figures.

Figure 6:
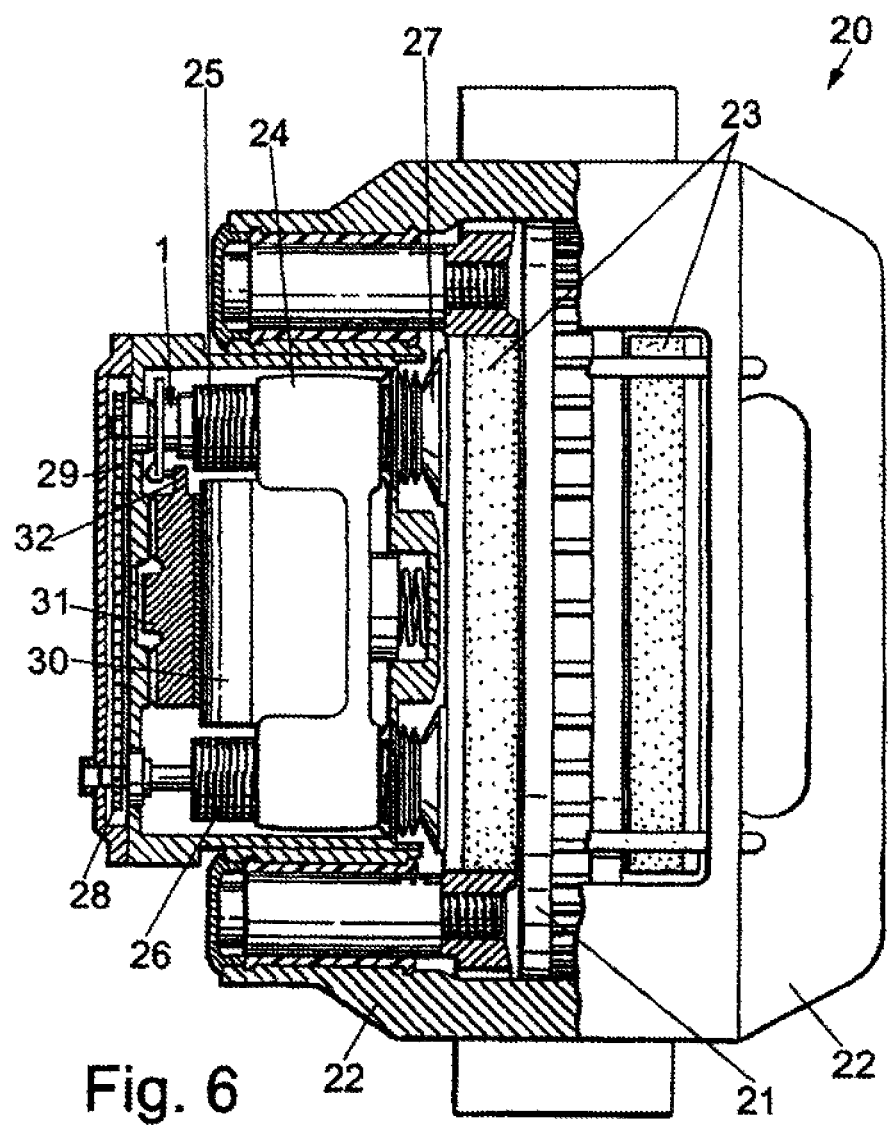
FIG. 6 is a schematic illustration of a disc brake.

With regard to the design and function of a pneumatic disc brake according to FIG. 6, reference is made to the corresponding description of DE 197 29 024 C1, the specification of which is expressly incorporated by reference herein. The following components are indicated in FIG. 6: disc brake 20, brake disc 21, brake caliper 22, brake pads 23, bridge 24, adjusting spindles 25 and 26, thrust pieces 27, sprockets 28, chain 29, eccentric 30 and rotary lever 31, which has a drive element 32 interacting with a shift fork of an adjusting device 1. The adjusting device 1 is in this case arranged in the adjusting spindle 25. An adjusting device 1 will now be explained in more detail. The adjusting device 1 would also be suitable for an electromotively actuated disc brake.

Figure 2:
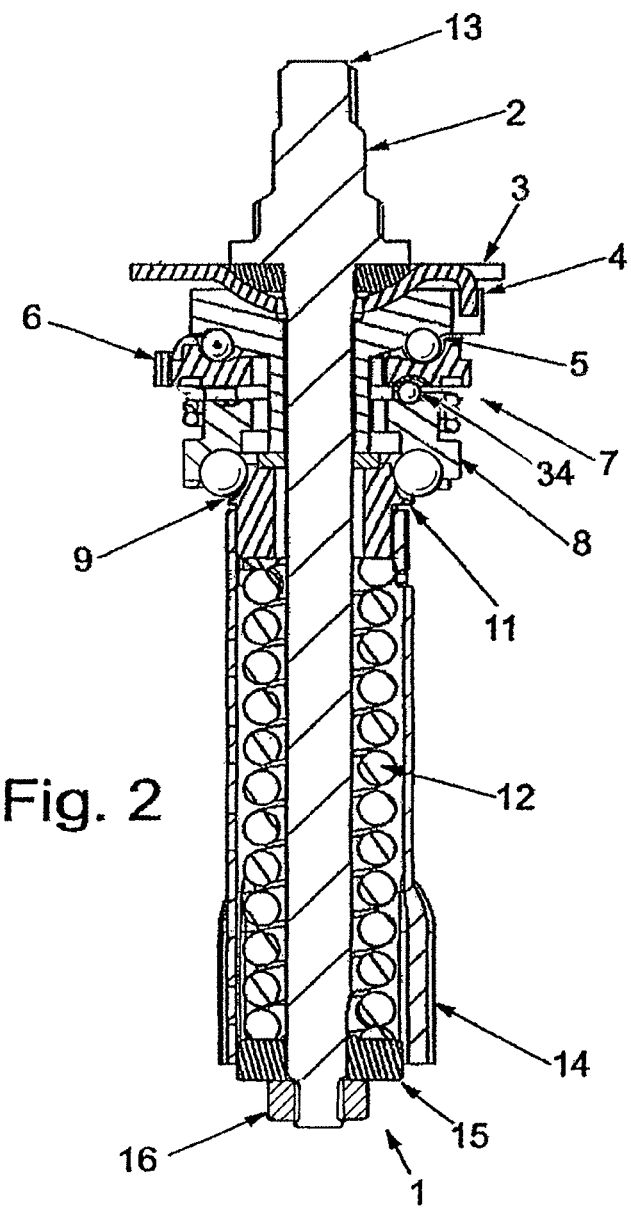
FIG. 2 is a partial section illustration of an exemplary embodiment of an adjusting device according to the invention.
Figure 3:
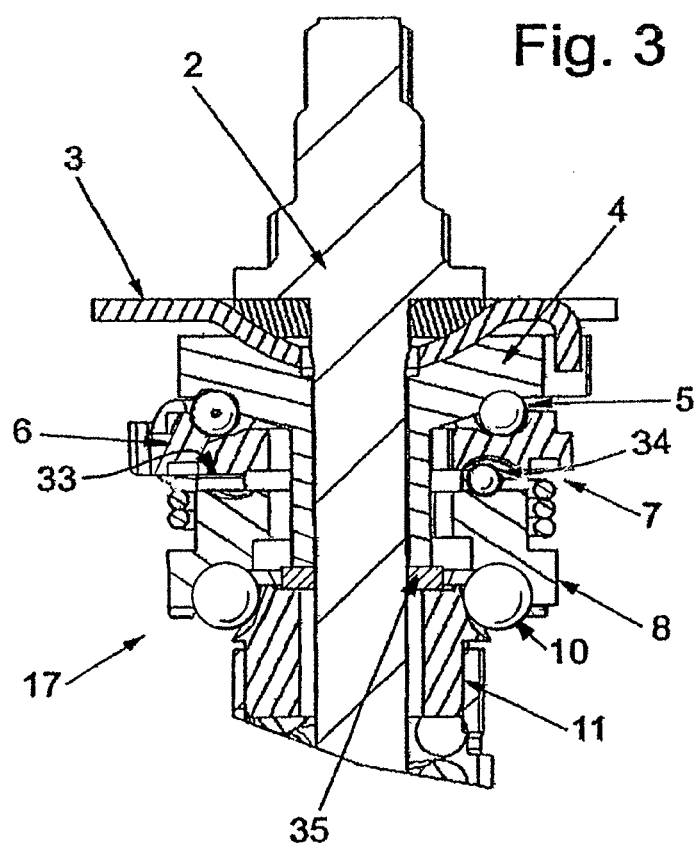
FIG. 3 is an enlarged partial section illustration of the upper region of FIG. 2.

In this regard, reference is made to FIGS. 1, 2 and 3. FIG. 1 is a sketch of the principles of the action of friction on a cone, and FIG. 2 shows a partial section illustration of an exemplary embodiment of an adjusting device 1 according to the invention. FIG. 3 illustrates an enlarged partial section illustration of the upper region of FIG. 2.

The adjusting device 1 has the following: a shaft 2, having a drive journal at its upper end; a bearing disc 3 for fastening the adjusting device 1 in the brake caliper 22 (see FIG. 6); a collar bush 4 which is rotationally fixedly coupled to the bearing disc 3 and has an upper collar with a running surface arranged therebelow for balls of an axial bearing 5; a (shift fork) drive ring 6 which is connected to a shift fork which is coupled to the drive element 32 (see FIG. 6) of the rotary lever 31; a ball ramp clutch 7 having a clutch ring 8 which interacts with a tapered bush 11 which is connected to a spring sleeve 14 for conjoint rotation therewith; a cylindrical spring 12 which is arranged in the spring sleeve 14 and which is supported on a profiled disc 15; and an adjusting element 16, for example a nut, which is arranged on the lower end of the shaft 2 and serves for stressing the cylindrical spring 12 and holding the elements of the adjusting device 1 together axially.

The ball ramp clutch 7 is composed of a drive bush 33, which is a lower section of the drive ring 6, balls or rolling bodies 34, and the clutch ring 8, with the clutch ring 8 having an upper section for receiving the balls and a lower section which forms a part of the cone clutch 17. The general function of the adjusting device 1 is described in detail in DE 10 2004 037 771 A1 with regard to FIG. 5, to which reference is hereby made.

Figure 5:
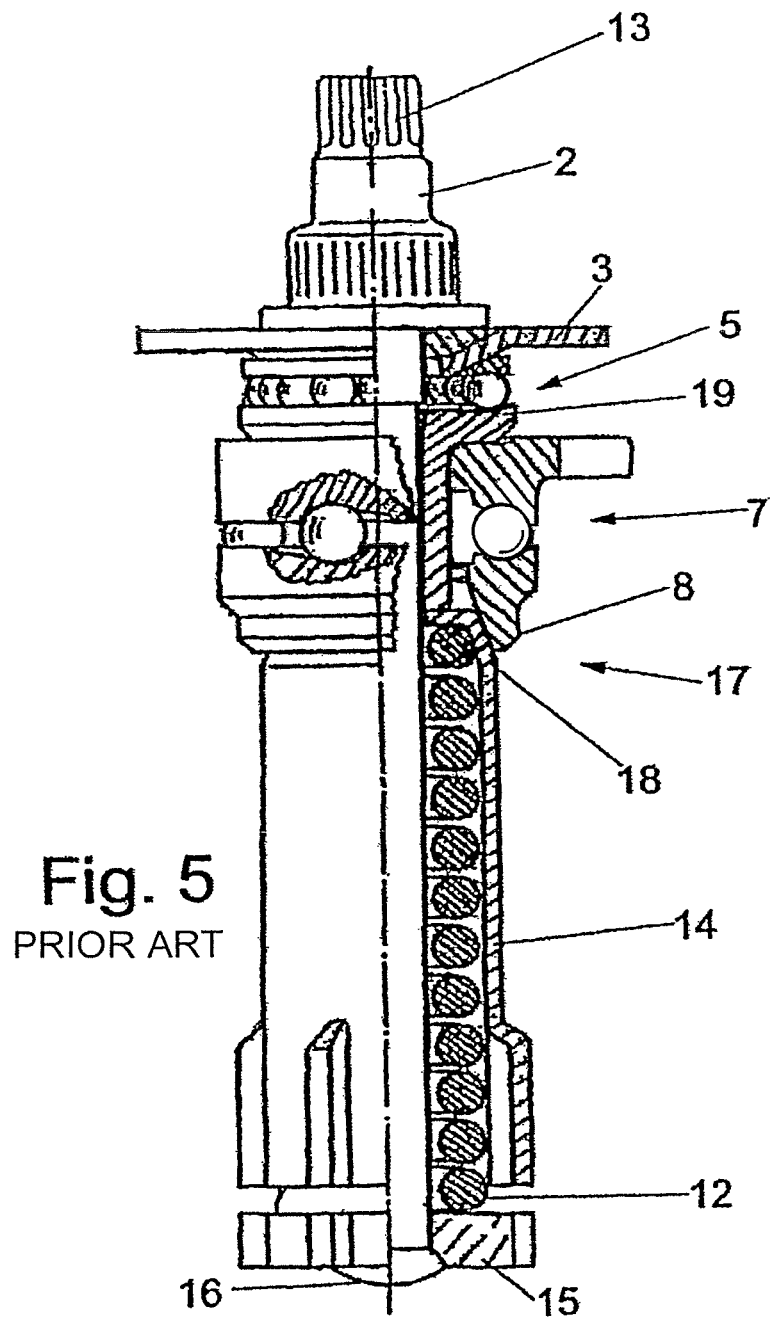
FIG. 5 is a partial section illustration of an adjusting device according to the prior art.

As a first difference in relation to the adjusting device according to FIG. 5, in the exemplary adjusting device 1 according to the present invention, the axial bearing 2 is formed from the collar of the collar bush 4, from one side of the drive ring 6 and from rolling bodies. The lower end of the collar bush 4 which extends through the ball ramp clutch 7 forms, directly or via a thrust washer 35, an axial stop for the tapered bush 11. The tapered bush 11 is pressed upward by the cylindrical spring 12 via the spring sleeve 14, with the cone clutch 17, ball ramp clutch 7 and axial bearing 5 components being held together and pressed together axially. The collar bush 4 with its stop serves to maintain a minimum play of the bearing arrangements.

A significant difference in relation to the prior art consists in that the cone clutch 17 is designed as a ball-cone clutch. The cone clutch ensures high clamping reliability in the circumferential direction and correct release behavior in the axial direction.

To obtain high clamping reliability in the circumferential direction, as small a cone angle $\alpha_K$ as possible is required in a cone clutch. FIG. 1 serves to illustrate this. This has the result that the normal force $F_{Norm}$ acting on the friction surface is as high as possible. The following relationship applies:

$F_{Norm} = F_{Axial}/\cos \alpha_K$.

Since the relationship:

$F_{Friction} = F_{Norm} \times \mu$ applies, it is thus possible in conjunction with the friction radius for a high friction moment to be generated.

As illustrated in FIG. 3, the cone clutch 17 is equipped with clamping balls 10. By means of the clamping balls 10, it is obtained that the inner tapered bush 11 can move in the axial direction without significant frictional locking on account of the rolling movement of the clamping balls 10. As a result of the mounting of the clamping balls in axially longitudinally running ball grooves 9, it is obtained that, in contrast, a friction-based blocking action is provided in the tangential direction.

This design offers the following advantages:

(1) correct release behavior in the axial direction even with very small taper angles;

(2) high friction action in the tangential direction;

(3) as a result of the mounting of the clamping balls 10 in ball grooves 9, linear contact, and therefore relatively favorable Hertzian stress, is provided between the clamping balls 10 and counterpart surface; and (4) cost-effective production of the parts by means of non-cutting shaping technology.

Figure 4:
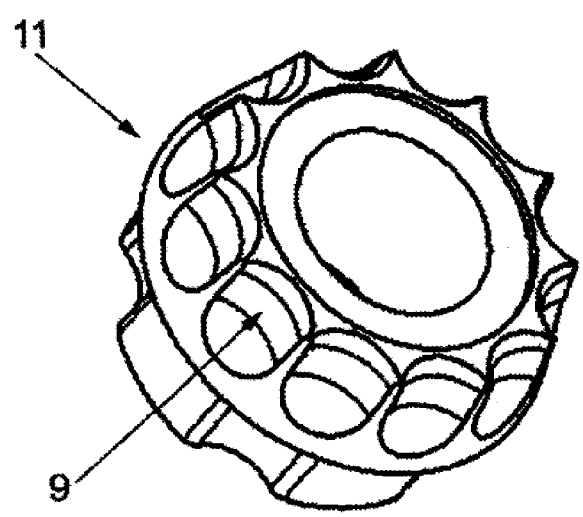
FIG. 4 is a perspective exemplary illustration of a tapered bush.

FIG. 4 shows a tapered bush 11 with ball grooves 9 in a perspective illustration. In this example, the tapered bush 11 has, on its side facing away from the cone clutch 17, a radial profiling which serves for being held in a positively locking manner in the upper end of the spring sleeve 14. Simple assembly is therefore ensured.

For example, the tapered bush 11 and the spring sleeve 14 may be formed in one piece.

| Table of Reference Numerals | |
|---|---|
| 1 | Adjusting device |
| 2 | Shaft |
| 3 | Bearing disc |
| 4 | Collar bush |
| 5 | Axial bearing |
| 6 | Drive ring |
| 7 | Ball ramp clutch |
| 8 | Clutch ring |
| 9 | Ball grooves |
| 10 | Clamping balls |
| 11 | Tapered bush |
| 12 | Cylindrical spring |
| 13 | Drive journal |
| 14 | Spring sleeve |
| 15 | Profiled disc |
| 16 | Adjusting element |
| 17 | Cone clutch |
| 18 | Sleeve cone |
| 19 | Spacer sleeve |
| 20 | Disc brake |
| 21 | Brake disc |
| 22 | Brake caliper |
| 23 | Brake pads |
| 24 | Cross-member (bridge) |
| 25 | First adjusting spindle |
| 26 | Second adjusting spindle |
| 27 | Thrust piece |
| 28 | Sprockets |
| 29 | Chain |
| 30 | Eccentric |
| 31 | Rotary lever |
| 32 | Drive element |
| 33 | Drive bush |
| 34 | Balls |
| 35 | Thrust washer |

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An adjusting device for a pneumatic disc brake having a rotary-lever-actuated brake application device, the adjusting device being insertable into an adjusting spindle of the brake application device, comprising:
   a drive ring;
   an axial bearing arranged axially on a drive input side of the drive ring, the axial bearing being formed in part from a drive input side portion of the drive ring;
   a ball ramp clutch with a freewheel function arranged axially on a drive output side of the drive ring, wherein the ball ramp clutch comprises balls of the ball ramp clutch arranged axially between a drive bush formed in part by a drive output side portion of the drive ring on a drive input side of the ball ramp clutch and a clutch ring on a drive output side of the ball ramp clutch;
   a spring sleeve for a cylindrical spring; and
   a cone clutch arranged between the ball ramp clutch and the spring sleeve, wherein the cone clutch comprises clamping balls arranged between a tapered bush connected to the spring sleeve having axially-extending ball grooves configured to receive the clamping balls on a drive input side of the tapered bush and an opposing surface of a drive output side portion of the clutch ring.

2. The adjusting device according to claim 1, wherein the tapered bush has an external profile corresponding to an internal profile of the spring sleeve to provide a rotationally conjoint connection.

3. The adjusting device according to claim 1, wherein the tapered bush and the spring sleeve are integrally formed.

4. The adjusting device according to claim 1, wherein the axial bearing includes rolling bodies and a collar of a collar bush extending axially through the ball ramp clutch.

5. The adjusting device according to claim 4, wherein one end of the collar bush extending through the ball ramp clutch forms an axial stop for the tapered bush.

6. The adjusting device according to claim 5, wherein the axial stop is formed one of directly or via a thrust washer.

7. A pneumatic disc brake, comprising:
   a caliper;
   a wear adjustor for adjusting wear of brake pads and a brake disc of the disc brake;
   a rotary lever actuated brake application device arranged in the caliper, the wear adjustor being arranged in an adjusting spindle of the brake application device; and
   wherein the wear adjustor comprises:
      a drive ring;
      an axial bearing arranged axially on a drive input side of the drive ring, the axial bearing being formed in part from a drive input side portion of the drive ring
      a ball ramp clutch with a freewheel function arranged axially on a drive output side of the drive ring, wherein the ball ramp clutch comprises balls of the ball ramp clutch arranged axially between a drive bush formed in part by a drive output side portion of the drive ring on a drive input side of the ball ramp clutch and a clutch ring on a drive output side of the ball ramp clutch;
      a spring sleeve for a cylindrical spring; and a cone clutch arranged between the ball ramp clutch and the spring sleeve, wherein the cone clutch comprises clamping balls arranged between a tapered bush connected to the spring sleeve having axially-extending balls on a drive input side of the tapered bush and an opposing surface of a drive output side portion of the clutch ring.

* * * * *